United States Patent Office 3,281,869
Patented Nov. 1, 1966

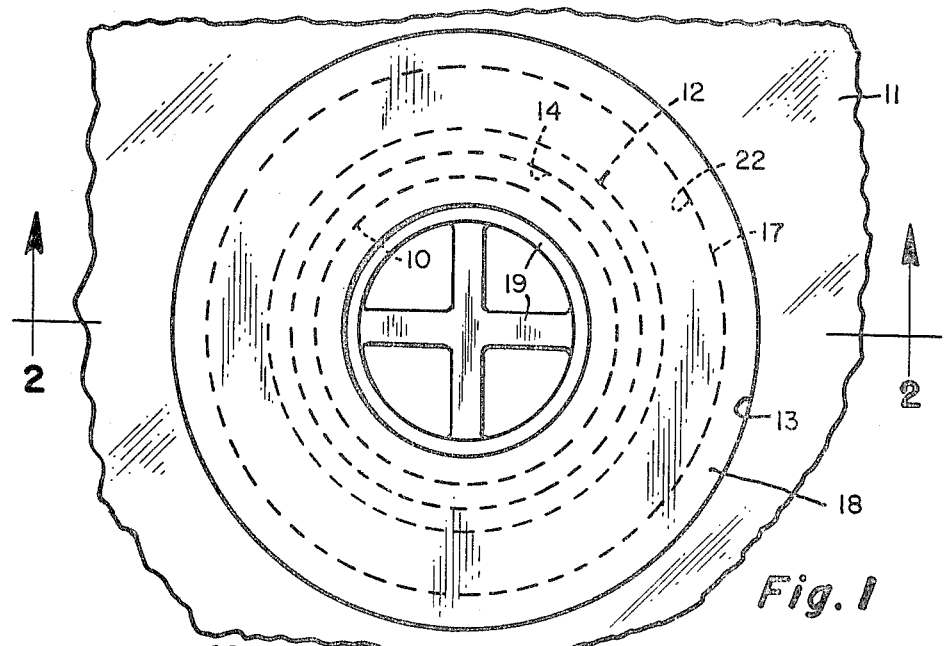
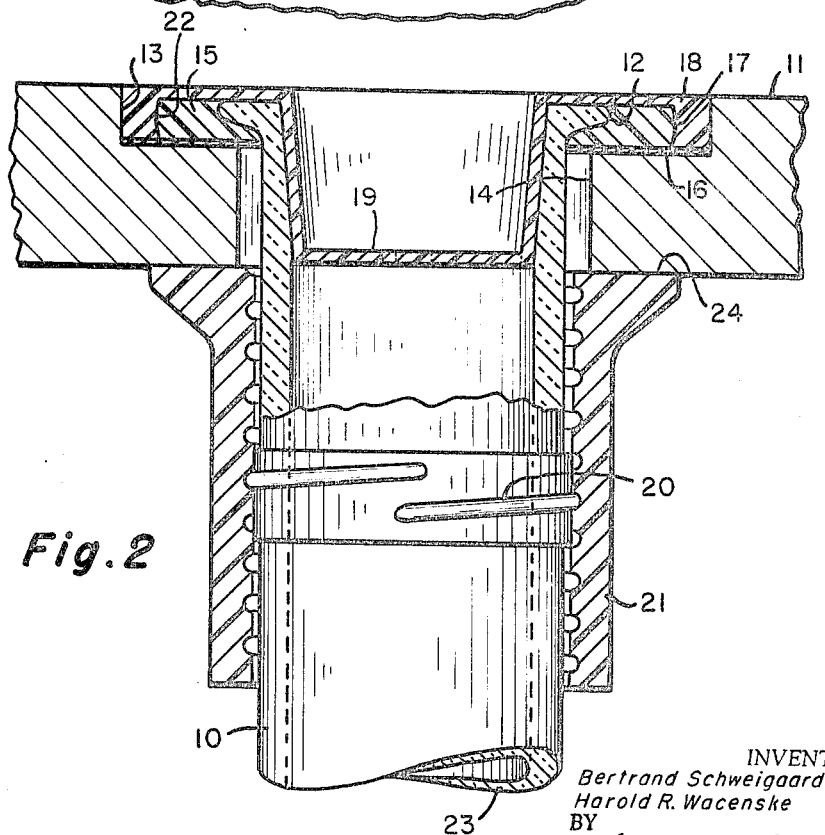

3,281,869
SINK STRAINER ASSEMBLY
Bertrand Schweigaard-Olsen, Corning, and Harold R. Wacenske, Painted Post, N.Y., assignors to Corning Glass Works, Corning, N.Y., a corporation of New York
Filed Feb. 12, 1964, Ser. No. 344,392
5 Claims. (Cl. 4—288)

This invention relates to sink strainers and more particularly to corrosion-resistant sink strainer assemblies for use in chemical laboratories.

It is an object of the invention to provide a sink strainer which can be easily assembled and which, when assembled, is completely leak proof and corrosion resistant.

The invention will be described with reference to the accompanying drawing, in which:

FIGURE 1 is a top plan view of a sink strainer assembly according to the invention, and FIGURE 2 is a sectional view taken on line 2—2 of FIGURE 1.

Referring to the drawing, the assembly of the present invention comprises glass pipe 10, which extends partially through sink base portion 11 and terminates in a flared end portion 12 located in a generally cylindrical counterbore 13 at the top of the generally cylindrical aperture defined by rim 14 of the sink base portion. Pipe section flared portion 12 bears downwardly upon inner ring 15, which preferably comprises polypropylene. Inner ring 15 in turn bears upon gasket 16, which may comprise any appropriate gasket material, for example neoprene. Inner ring 15 has an outer rim 17 which is convex in axial cross section. Thus, when outer ring 18, which preferably comprises polychlorotrifluoroethylene and which has an inner surface 22 which is concave in axial cross section and which is generally complementary to rim 17, is pressed around inner ring 15 in a downward direction in FIGURE 2, due to the resiliency of the rings, outer ring 18 is locked around inner ring 15 in the illustrated position, such that the outer ring and strainer portion 19 depending therefrom are tightly held in position in the sink when pipe section 10 is held in position by means of the interaction between pipe thread 20 and the threaded inner surface of collar 21.

The present apparatus is assembled by first passing inner ring 15 over the unflared end of pipe section 10 and bringing the ring up against the lower edge of flared pipe end 12. Next, outer ring 18 is placed around inner ring 15 and over the flared end of pipe section 10, with strainer portion 19 located within the bore of the pipe section. Due to the fact that outer rim 17 of inner ring 15 is convex in axial section, while inner surface 22 of outer ring 18 is concave in vertical section, and due to the fact that these parts are slightly resilient, the outer ring passes over the inner ring and snaps into the locking position illustrated in FIGURE 2, with pipe end 12 held between the respective rings, and with strainer portion 19 located within the bore of pipe section 10. Next, gasket 16 is placed in counterbore portion 13, and end 23 of pipe section 10 is inserted through the aperture in sink base portion 11. Collar 21 is then screwed over thread 20, thereby drawing pipe section 10 downwardly and compressing gasket 16 as edge 24 of collar 21 bears against the bottom surface of sink base portion 11.

It will be appreciated that the exact configurations of the respective parts of the present assembly may be varied. For example, in place of convex rim 17 of inner ring 15 and concave inner surface 22 of outer ring 18, there may be substituted complementary threaded surfaces, or surface 17 may be made concave and surface 22 convex. Arrangements in which at least a portion of outer ring 18 extends between the bottom surface of counterbore 13 and a portion of inner ring 15 when the respective rings are in the positions illustrated in FIGURE 2 will permit such locking.

Inasmuch as further variations may be made within the scope of the present invention, it is intended that such scope be limited only by the scope of the appended claims.

We claim:

1. A strainer assembly comprising a section of pipe having an outwardly flared end portion, said end portion being fixed between two rings, the first said ring having an inner diameter less than the diameter of said flared end portion and bearing upon the surface of said end portion adjacent to the main body of said pipe section and the second said ring bearing upon the opposite side of said flared end portion and extending at least partially around a portion of said first ring in the direction of said main body of said pipe section in order to lock said flared end portion between said rings, and located within said pipe section a strainer depending from said second ring.

2. A sink strainer assembly comprising a section of pipe extending partially through a base portion of a sink and terminating in a flared end portion extending into a counterbore portion formed in said base portion, a first ring surrounding said pipe section and extending between said flared end portion of said pipe section and the bottom surface of said counterbore portion, a second ring extending along the end of said flared end portion and having a portion located between a portion of said first ring and said bottom surface of said counterbore portion, a strainer portion located within said pipe section and depending from said second ring and means for drawing said flared end portion of said pipe section in the direction of said bottom surface of said counterbore portion.

3. An assembly according to claim 2 in which said first ring has an outer surface which is convex in axial cross section, said second ring has a surface complementary to and contiguous with said outer surface of said first ring and at least one of said rings comprises a resilient material.

4. An assembly according to claim 2 in which said means comprises an internally threaded collar surrounding a threaded portion of the outer surface of said pipe section, said collar being located on the side of said sink base portion opposite said counterbore portion and bearing upon the surface of said base portion opposite said counterbore portion.

5. An assembly according to claim 2 which includes an annular gasket located between said bottom surface of said counterbore portion and said first ring.

References Cited by the Examiner
UNITED STATES PATENTS

| 2,397,500 | 4/1946 | Merker et al. | 285—158 |
| 2,520,362 | 8/1950 | Goolsbee | 285—158 |
| 3,178,206 | 4/1965 | Martin et al. | 4—288 |
| 3,181,899 | 5/1965 | McKnight | 285—161 |

LAVERNE D. GEIGER, *Primary Examiner.*

H. ARTIS, *Examiner.*